United States Patent [19]

Oe et al.

[11] Patent Number: 4,746,049
[45] Date of Patent: May 24, 1988

[54] APPARATUS FOR FABRICATING MULTI-LAYER SPIRAL TUBES

[75] Inventors: Tsutomu Oe; Sadatomi Uemukai; Tadao Ozaki; Katsuzo Sudo; Yoshinori Yuzaki, all of Hiroshima, Japan

[73] Assignee: Mitsubishi Jukogyo Kabushiki Kaisha, Tokyo, Japan

[21] Appl. No.: 929,954

[22] Filed: Sep. 22, 1986

Related U.S. Application Data

[63] Continuation-in-part of Ser. No. 782,267, Sep. 30, 1985, abandoned.

[30] Foreign Application Priority Data

Dec. 4, 1984 [JP] Japan .................. 59-254988

[51] Int. Cl.$^4$ .................................. B23K 5/02
[52] U.S. Cl. .................................. 228/17.7
[58] Field of Search .................. 228/7, 9, 17, 17.7, 228/145; 72/49, 50, 199, 135, 146, 148

[56] References Cited

U.S. PATENT DOCUMENTS

| | | |
|---|---|---|
| 2,937,436 | 5/1960 | Butler et al. |
| 3,425,118 | 2/1969 | Dobell et al. |
| 3,549,077 | 12/1970 | Huck .................. 228/145 |
| 3,557,335 | 1/1971 | Sablotny .............. 228/145 |
| 3,619,897 | 11/1971 | Oppermann et al. |
| 3,651,677 | 3/1972 | Siegwart. |
| 3,888,283 | 6/1975 | Cauffiel. |
| 4,061,264 | 12/1977 | Bartels et al. .......... 228/145 |
| 4,247,033 | 1/1981 | Dahmen et al. |
| 4,505,417 | 3/1985 | Makarov et al. ........ 228/17.7 |
| 4,640,453 | 2/1987 | Oe et al. ............... 228/145 |

Primary Examiner—M. Jordan
Attorney, Agent, or Firm—Wenderoth, Lind & Ponack

[57] ABSTRACT

An apparatus for fabricating multi-layer spiral tubes of the type that while the webs are being wrapped in a spiral form the adjacent edge portions of the webs are welded with each other to form spiral tubes, is improved in that the apparatus has a take-up drum for taking up the wrapped webs while rotating with the leading end of the web of the first layer fixedly secured thereto, a wrapping drum having the webs wrapped therearound and including a backing section for backing a welding location of the edge portions of the web of the first layer, a plurality of web feed devices provided adjacent one another for spirally feeding the webs on the wrapping drum of the spiral tubes of the preceding layers, a plurality of wrapping devices provided in combination with the respective web feed devices for spirally wrapping the web on the wrapped drum or the spiral tubes of the preceding layers, and a drawing device for drawing from the wrapping drum the spiral tubes that are being formed continuously.

1 Claim, 4 Drawing Sheets

APPARATUS FOR FABRICATING MULTI-LAYER SPIRAL TUBES

BACKGROUND OF THE INVENTION

1. Field of the Invention

This application is a Continuation-In-Part of Ser. No. 782,267 filed Sept. 30, 1985 and now abandoned.

The present invention relates to an apparatus for fabricating multi-layer spiral tubes which are available as pressure-resistant large-diameter steel pipes for piping or cylindrical drums for columns, tanks, heat-exchangers or the like.

2. Description of the Prior Art

Large-diameter high-pressure steel pipes for pipe-line use are associated with great difficulties in transportation because they are frequently used in areas inconvenient to access. Furthermore, pipes of long dimensions having a pressure-resistance in performance and moreover being excellent in the degree of roundness and of high precision such that a dimensional error such as misalignment at weld joint portions is small, are required in the construction industry.

The large-diameter welded steel pipes in the prior art are generally classified into single-layer pipes and multi-layer pipes. The single-layer pipes are sub-classified into those called UO tubes formed by rolling a sheet and having a straight weld joint along their longitudinal direction and spiral tubes having a spiral weld joint, and the multi-layer pipes are sub-classified into those of swirl type or concentric circle type and those of spiral type in which a web is wrapped spirally around an inner cylinder or inner tubes.

An outline of an apparatus for fabricating multi-layer spiral tubes in the prior art is shown in FIGS. 3(a) and 3(b). In these figures, a web 01 delivered from a coil-shaped web 01a is wrapped around a rotating inner cylinder 018 supported by a supporting device 017 with the aid of a wrapping device 014. For this inner cylinder 018, normally the UO tube is used. On the feed device for delivering the web 01, a leveler 010, a sheet-jointing welding machine 05, pinch rolls 03, a heating device 013 and the like are provided. In the wrapping device 014 a welding machine 015 and a grinding machine 016 are provided. Hence, after the side edge portions of the web 01 wrapped around the inner cylinder 018 have been butt-welded with each other, the welded places are ground to form a spiral tube.

On the other hand, an outline of an apparatus for fabricating single-layer spiral tubes known in the prior art is shown in FIG. 4. With reference to this figure, a coil-shaped web 01a is delivered by pinch rolls 03 via a leveler 010. It is then bent by means of bending rolls 04, and adjacent side edge portions of a web 01 are welded together by means of an inner surface welding machine 06 and an outer surface welding machine 07 while maintaining the cylindrical shape of the bent web 01 by means of inner surface guide rolls (not shown) and outer surface guide rolls (not shown). The thus formed tubular body is received by a receiving roll (not shown) to be sent in the direction of an arrow indicated in FIG. 4, and after it is cut into a predetermined dimension, a spiral tube 02 is completed. It is to be noted that the web 01 delivered from the coil-shaped web 01a has its side edge portions to be welded together machined by a side trimmer 08 and an edge preparing machine 09 and can be successively jointed by the sheet-joining welding machine 05, and therefore, fabrication of long tubes is possible.

Among the heretofore known tubular materials, the UO tubes and the multi-layer tubes of swirl type or concentric circle type have shortcomings in that their fabrication to long dimensions is limited and even if they were to be lengthened by jointing through circumferential welding they would be expensive.

On the other hand, the multi-layer tubes of spiral type also have similar shortcomings to the above-described ones in that since the UO tube is used as the inner cylinder, the fabrication of the tube to long dimensions is limited. In addition, in the case of the single-layer spiral tubes in the prior art, although fabrication of long dimension tubes is possible by jointing the webs, they were solely used for general structures and believed to be inadequate for pressure-resistant steel pipes due to the fact that in addition to a poor degree of roundness, a dimensional error caused by misalignment at the spiral weld portions was large.

Even if the pressure-resistant steel pipes such as the above-described multi-layer tubes were successively jointed through circumferential welding in a factory to increase their length dimension, transportation of them was difficult because the location of the constructing of a pipe-line was a remote area. Hence, increasing their length had to be done at the field of construction by circumferentially welding short tubes, and thus they had shortcomings in that it was not easy to obtain long-dimension pressure-resistant steel pipes of satisfactory quality and the cost of construction would become high.

SUMMARY OF THE INVENTION

It is a principal object of the present invention to provide an improved apparatus for fabricating multi-layer spiral tubes, which has a simple structure and yet is free from the above-described shortcomings of the fabricating apparatus in the prior art.

A more specific object of the present invention is to provide an apparatus for fabricating multi-layer spiral tubes, which can be disposed at the field of construction of a pipe-line and can fabricate pressure-resistant spiral tubes of excellent quality, and yet which has a simple structure.

According to one feature of the present invention, there is provided an apparatus for fabricating multi-layer spiral tubes, which comprises: a wrapping drum supported at its one end by a chuck of a drive mechanism so as to be rotatable around a horizontal axis; a take-up drum coupled with another drive mechanism for translation and rotation thereof, having the same diameter as said wrapping drum, being movable in the direction of the axis of said wrapping drum, and being rotatable around the common axis at the position opposite to said wrapping drum; a web feed device for the first layer for spirally feeding the web on said wrapping drum with the leading end of the web fixedly secured on said take-up drum; a wrapping device for the first layer web for wrapping the web fed through said web feed device for the first layer on said wrapping drum, depessing the web thus wrapped, and jointing by welding the adjacent side edge portions of the wrapped web to form a spiral tube of the first layer; web feed devices for upper layers provided adjacent the side of the take-up drum of said web feed device for the first layer for spirally feeding the webs on the spiral tubes of the lower layers so as not to make the welding lines of the upper and lower layers coincident with each other; and wrapping devices for upper layer webs for spirally wrapping the webs thus fed on the spiral tubes of the lower layers, depressing the webs thus wrapped, and jointing by welding the adjacent side edge portions of the wrapped webs to form spiral tubes of the upper layers.

In operation, the leading end of the web of the first layer is fixedly secured to the take-up drum at a predetermined wrapping angle, and the wrapped web is taken up by the take-up drum. This take-up drum is movable along its axial direction on a floor, and it performs a take-up operation by moving in a direction going away from the feed side of the web while rotating at the wrapping speed, that is, at the speed of welding the adjacent side edge portions of the web wrapped in a spiral manner.

On the other hand, the wrapping drum having its outer circumferential surface as a precise circular cylinder is not moved in its axial direction, but the web is wrapped therearound while it is rotated at the same speed as the take-up drum. Backing is effected for its side edge portions from its inner surface by means of the backing section of the wrapping drum. One side welding is effected from its outer surface on the opposite side to the backing section to form a full penetration weld portion.

In such a way, the wrapped and welded web forms a spiral tube, which in turn is drawn out of the wrapping drum by moving the take-up drum in the direction away from the web feed device.

The webs of the upper layers are fed at the wrapping angle parallel to that of the first layer web on the above-described spiral tube from the web feed devices for the upper layers disposed adjacent the web feed device for the first layer, and the wrapping devices for the upper layer webs wrap the upper layer webs around the said spiral tube, depress the webs thus wrapped, and are joined by welding the adjacent side edge portions of the upper layer webs to form the upper layer spiral tubes, thereby the long-dimension spiral tubes wrapped in a plurality of layers being continuously fabricated.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIG. 4 is a schematic view of an apparatus for fabricating single-layer spiral tubes in the prior art.

DESCRIPTION OF THE PREFERRED EMBODIMENTS

Figure 1A:
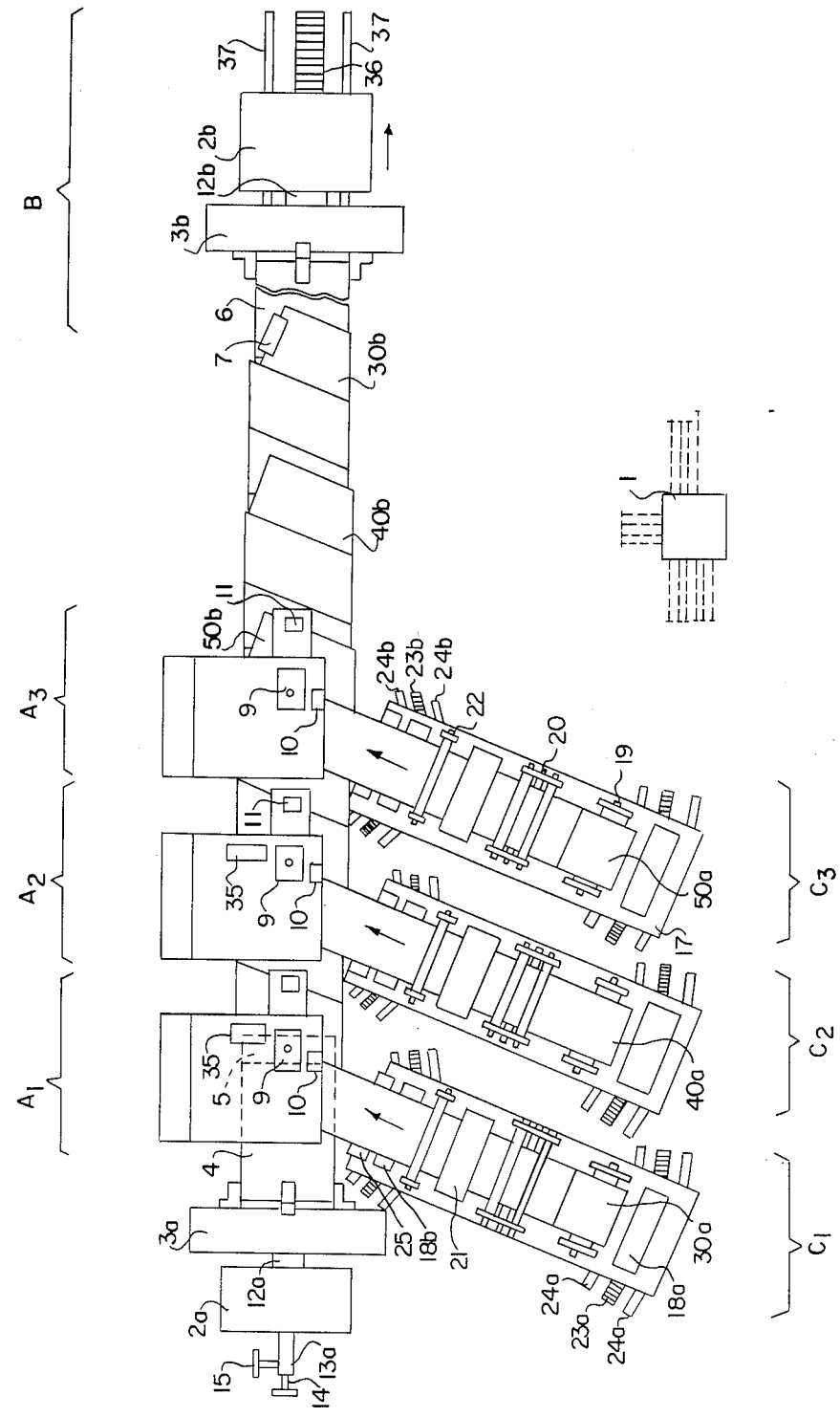
FIG. 1(a) is a plan view of an apparatus for fabricating multi-layer spiral tubes according to one preferred embodiment of the present invention.
Figure 1B:
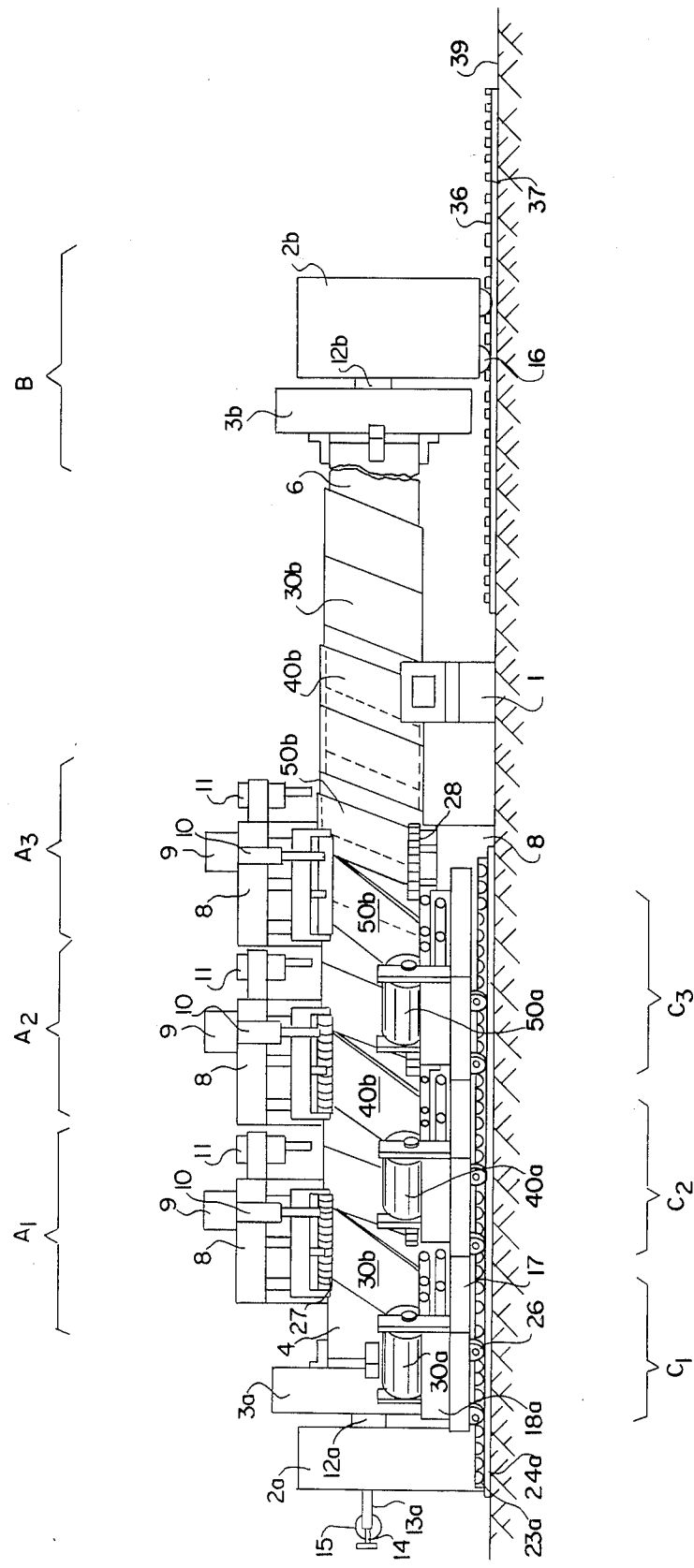
FIG. 1(b) is a side view of the same apparatus.

A plan configuration of an apparatus for fabricating multi-layer spiral tubes according to one preferred embodiment of the present invention is shown in FIG. 1(a), and a side configuration of the same apparatus is shown in FIG. 1(b). Referring to these figures, a chuck $3a$ is mounted via a shaft $12a$ to a drive mechanism $2a$ disposed on a floor 39, and a wrapping drum 4 is mounted to this chuck $3a$ so as to be rotated by the drive mechanism $2a$. The chuck $3a$ can be adjustably moved in the radial direction so as to be adapted to different outer diameters of the wrapping drum 4 similar to the conventional chuck for use in a machine tool. A web feed device $C_1$ for the first layer is provided opposite the side of the wrapping drum 4, and the web $30b$ is fed from coiled web $30a$ to the wrapping drum 4 at a certain angle. At a wrapping position for a web $30b$, a frame 8 for wrapping is disposed on the floor 39, and on this frame 8 are equipped a group of depressing rolls 27, a group of supporting rolls 28, an automatic welding machine 9, a laser gap sensor 10 and an automatic magnetic defect hunter 11. The group of depressing rolls 27 and the group of supporting rolls 28 are rotatably supported so that the directions of the respective rolls can be varied in accordance with variation of a wrapping angle, i.e., a feed angle of the web $30b$. A wrapping device $A_1$ is comprised of the drive mechanism $2a$, the wrapping drum 4, the frame 8 and the above-mentioned other component members. Toward the right as viewed in FIGS. 1(a) and 1(b) away from the end of the wrapping drum 4, there are provided web feed devices $C_2$ and $C_3$ for upper layers, i.e., second and third layers, and, in combination with each of these web feed devices, there are provided wrapping devices $A_2$ and $A_3$ comprised of the same components as the wrapping device $A_1$.

On the floor 39 are a rack 36 and rails 37 extending parallel to the axis of the wrapping drum 4. Another drive mechanism $2b$ is placed on the rails 37 via wheels 16. The drive mechanism $2b$ can be moved along the rails 37 by the meshing of a pinion (not shown) that is rotated by a motor (not shown) assembled in the drive mechanism $2b$ with the rack 36 on the floor 39.

One end of a take-up drum 6 is supported by a chuck $3b$ that is fixedly secured to a shaft $12b$ of the drive mechanism $2b$. This chuck $3b$ also can be adapted to adjust to variation of the outer diameter of the take-up drum 6 similar to the chuck $3a$ and the wrapping drum 4. In FIG. 1(a), the take-up drum 6 has such a length that its tip is brought into contact with the end surface of the wrapping drum 4 when the chuck $3b$ is moved leftward as viewed in FIG. 1(a) until being closest to the wrapping device $A_3$. Furthermore, the take-up drum 6 is provided with a fixing device 7, and upon commencement of wrapping of the web $30b$, the leading end of the web $30b$ is fixedly secured to the take-up drum 6 by means of the fixing device 7. The outer diameter of the take-up drum 6 is the same as that of the wrapping drum 4. The take-up drum 6 is rotated at the same speed as the wrapping drum 4 is as driven by the drive mechanism $2b$. A drawing device B is comprised of the above-described rails 37, drive mechanism $2b$ and chuck $3b$ and other component members.

A feed table 17 for feeding the web $30b$ to the wrapping drum 4 is placed on arcuate rails $24a$ and $24b$ disposed on the floor 39. On this feed table 17 are disposed drive mechanisms 18a and 18b, a pay-off reel 19, a leveler 20, a sheet jointing welding machine 21, pinch rolls 22 and a heater 25. The web 30b is fed from a coil 30a charged on the pay-off reel 19 through the leveler 20 and the pinch rolls 22 to the wrapping drum 4 and the wrapping device A. The feed table 17 can be moved on the arcuate rails 24a and 24b in the left and right directions as viewed in FIGS. 1(a) and 1(b) by meshing between pinions not shown which are mounted within the drive mechanisms 18a and 18b, respectively, and the above-described arcuate racks 23a and 23b disposed on the floor 39, so that the feed angle of the web 30b can be varied.

The heater 25 is equipped with an electric resistance heat generator (not shown) which is divided into a plurality of heat generator sections along the widthwise direction of the web 30b that is fed to pass thereover, and the respective heat generator sections can be adjusted to have different heat generating rates by phase-controlling the magnitude of the electric current by means of a thyristor. In this connection, it is also possible to dispose a plurality of gas burners in place of these electric resistance heat generator sections and to control the combustion rates of the respective gas burners. A feed device $C_1$ for the first layer web is comprised of the above-described arcuate rails 24a and 24b, feed table 17, and other component members. The web feed devices $C_2$ and $C_3$ for the second and third layers respectively are comprised similarly to the web feed device $C_1$ for the first layer, and feed the webs 40b and 50b from the coiled webs 40a and 50a to the corresponding wrapping devices $A_2$ and $A_3$ respectively. The wrapping device $A_2$ wraps the web 40b on the spiral tube fabricated from the web 30b, and welds the same to fabricate the spiral tube of the second layer, while the wrapping device $A_3$ fabricates the spiral tube of the third layer in the similar way.

The above-mentioned wrapping devices $A_1$ through $A_3$, drawing device B and feed devices $C_1$ through $C_3$ are all coupled to a central control unit 1 containing a micro-computer therein, and provision is made such that the central control unit 1 momentarily achieves arithmetic processing by means of the micro-computer on the basis of preliminary input operation and detection data input from sensors or the like associated with the respective devices A, B and C, and issues operation commands to the respective devices, and thereby the respective devices can perform appropriate operations.

Figure 2A:
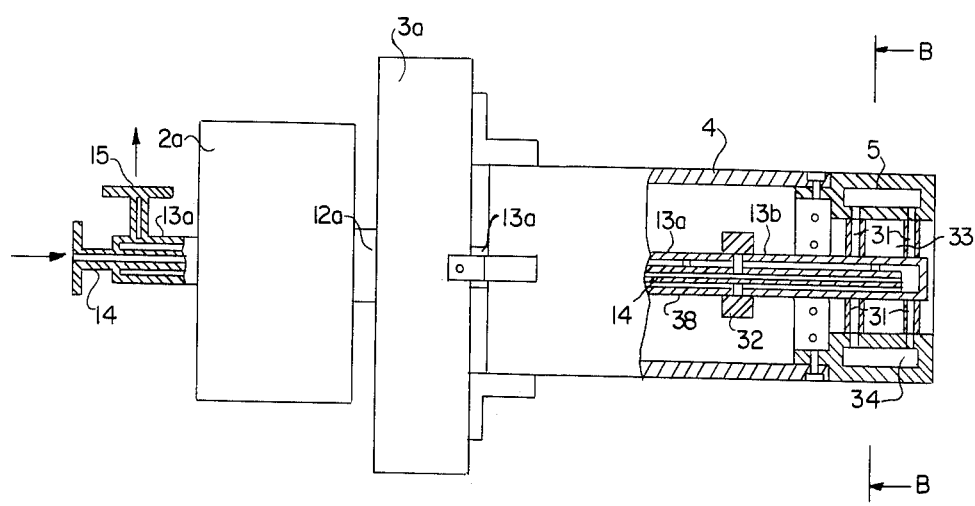
FIG. 2(a) is an enlarged partial cross-sectional view showing an inner structure of a backing section of a wrapping drum.
Figure 2B:
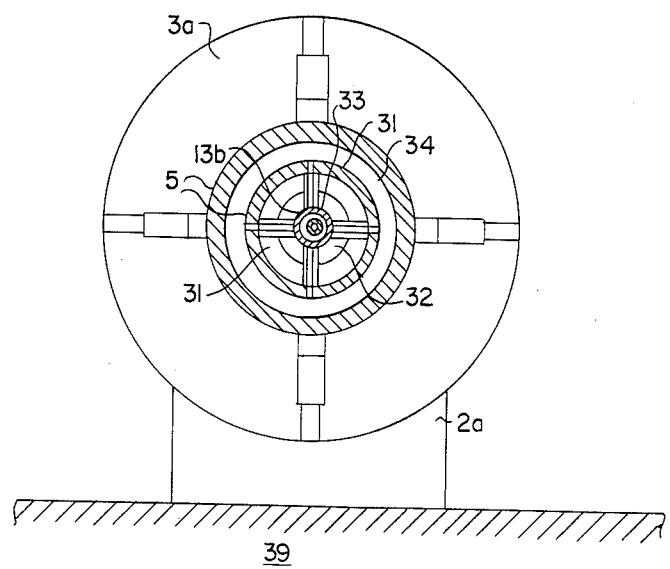
FIG. 2(b) is a transverse cross-sectional view taken along line B—B in FIG. 2(a) as viewed in the direction of arrows.
Figure 3A:
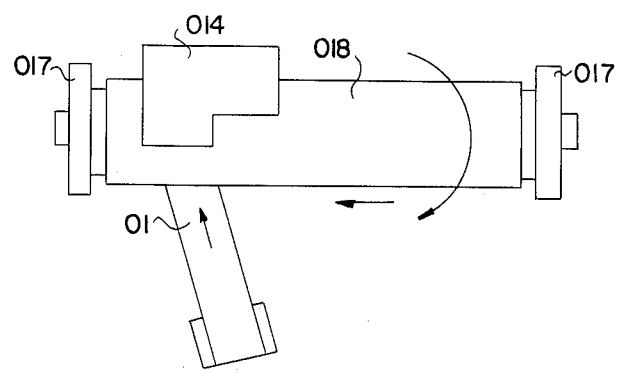
FIG. 3(a) is a schematic view of an apparatus for fabricating multi-layer spiral tubes in the prior art.
Figure 3B:
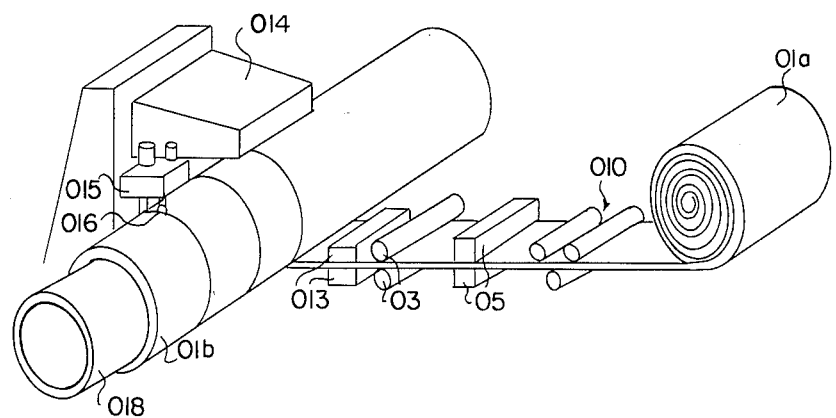
FIG. 3(b) is a perspective view of a principal part of the same apparatus.

The inner structure of the above-described wrapping device A is shown in an enlarged scale in FIGS. 2(a) and 2(b). Referring to these figures, to the end of the wrapping drum 4 is fixedly secured a backing section 5 having a cylindrical shape and made of copper. Both the wrapping drum 4 and the backing section 5 have the same outer diameter, and their outer circumferential surfaces are formed with a minute taper so that the spiral tube formed by wrapping and welding the web 30b can be easily drawn as sliding along the outer circumferential surfaces in their axial direction. A water-cooling jacket 34 is provided on the inside of the backing section 5, and the water-cooling jacket 34 is connected through distribution pipes 31 to a water-feed/drain outer tube 13b. A drain outer tube 13a, the water-feed/drain outer tube 13b and a water-feed inner tube 14 form a double tube structure. The drain outer tube 13a is fixedly secured to the drive mechanism 2a, then it penetrates through the interior of the shaft 12a as supported by bearings (not shown) and extends up to the interior of the wrapping drum 4. The drain outer tube 13a communicates with a drain piping (not shown) through a drain nozzle 15, while the water-feed inner tube 14 communicates with a water-feed piping (not shown). The fixed drain outer tube 13a and the rotatable water-feed/drain outer tube 13b are coupled with each other by means of a rotary joint 32, and thereby leakage of coolant drain water is prevented. The interval between the water-feed inner tube 14 and the drain outer tube 13a is assured by means of spacers 38, so that coolant drain water can easily flow through the passageway between these tubes 14 and 13a. Between the tip end portion of the water-feed inner tube 14 and the water-feed/drain outer tube 13b, a gland packing 33 is equipped as a provision for preventing the feed coolant water from flowing into the drain passageway. Accordingly, coolant water feed from a water-feed piping (not shown) is fed into the water-cooling jacket 34 through the water-feed inner tube 14, the water-feed/drain outer tube 13b and the distribution pipes 31. After it has cooled the backing section 5, it passes through the distribution pipes 31, the water-feed/drain outer tube 13b, the drain outer tube 13a and the drain nozzle 15, and thereafter it is drained through a drain piping (not shown).

It is to be noted that a cylindrical body made of ceramics can be used as the backing section 5 in place of the cylindrical body made of copper, and in this modified embodiment, since cooling can be achieved by air-cooling, the above-described members for water-cooling such as the water-cooling jacket 34, the distribution pipes 31, the drain outer tube 13a, the water-feed/drain outer tube 13b, the water-feed inner tube 14 and the like would become unnecessary.

Upon fabricating a spiral tube, at first the take-up drum 6 is moved leftwards as viewed in FIGS. 1(a) and 1(b) until it comes into contact with the backing section 5. Subsequently, the desired inner diameter dimension of the spiral tube, that is, the desired outer diameter dimension of the wrapping drum 4 and the take-up drum 6, the outer diameter dimensions of the spiral tubes fabricated from the webs 30b and 40b, the width dimensions of the webs 30b, 40b and 50b, and the desirable gap dimension between the side edges of the webs 30b, 40b and 50b are input to the central control unit 1 to the drive mechanisms 18a and 18b in the respective feed devices $C_1$, $C_2$ and $C_3$ on the basis of the results of calculation to move the respective feed tables 17, and thereby the angle of feeding of the webs 30b, 40b and 50b from the feed devices $C_1$, $C_2$ and $C_3$ with respect to the direction of the axes of the wrapping drum 4, backing section 5, take-up drum 6, and spiral tubes fabricated from the webs 30b and 40b, that is, the wrapping angle as well as the orientations of the depressing roll group 27 and the supporting roll group 28 can be adjusted.

Thereafter, the coils 30a, 40a and 50a are charged in the pay-off reels 19, and after the web 30b has, at first, been flattened by the leveler 20, it is fed to the wrapping device $A_1$ by the pinch rolls 22. The tip end of the fed web 30b is fixedly secured to the take-up drum 6 by means of the fixing device 7. The take-up drum 6, the wrapping drum 4 and the backing section 5 are rotated at a predetermined wrapping speed that is equal to a predetermined welding speed, and the web 30b is wrapped around these drums and is depressed by the depressing roll group 27. As the take-up drum 6 moves in the rightward direction as viewed in FIGS. 1(a) and 1(b), and when the fixing device 7 has passed over the supporting roll group 28, the supporting roll group 28 is jacked up to a predetermined height to make them support the wrapped web 30b.

Then, when the drums have made one revolution from their initial position for wrapping and a welding gap has been formed between adjacent side edge portions of the web 30b, welding is commenced by the automatic welding machine 9, and after one further revolution, reliability of the welded location is confirmed by means of the automatic magnetic defect hunter 11. At this moment, since the welded location of the side edge portions of the web 30b is backed by the outer circumferential surface of the backing section 5, drop of weld caused by deep weld penetration can be prevented. In addition, during the wrapping of the web 30b, the gap dimension between the adjacent side edge portions of the web 30b is monitored by the laser gap sensor 10 and the monitored data are input to the central control unit 1. Hence, if the monitored gap dimension is about to exceed a dimensional tolerance, the central control unit 1 analyzes the data by means of the microcomputer, converts them into signals and issues commands to the drive mechanisms 18a and 18b and the heater 25 in the feed device $C_1$. If the gap dimensions become close to the upper limit of the tolerable range, then the wrapping angle is changed by slightly moving the feed table 17 in the rightward direction as viewed in FIGS. 1(a) and 1(b), resulting in an increase of the tension in the left side portion of the web 30b as viewed in FIGS. 1(a) and 1(b). Also the heat generator sections (not shown) in the left side portion of the heater 25 as viewed in FIGS. 1(a) and 1(b) are made to generate heat and thus the wrapped web 30b is made to have a temperature gradient in its widthwise direction to be bent slightly, and thereby the above-mentioned gap dimension is narrowed. On the contrary, if the gap dimension becomes close to the lower limit of the tolerable range, the operation opposite to that described above is carried out. In this way, while the gap dimension is always maintained within the tolerable range, simultaneously with wrapping of the web 30b, the side edge portions of the web 30b are constrained under pressure by the depessing roll group 27, and are welded together to form a spiral tube.

On the other hand, the drawing device B moves the take-up drum 6 in the rightward direction as viewed in FIGS. 1(a) and 1(b) at a speed of one pitch (of the spiral of the wrapped web) per revolution while rotating the take-up drum 6 at the same speed as the wrapping speed, and thus it draws the formed spiral tube from the wrapping drum 4 and the backing section 5.

When the fixing device 7 on the take-up drum 6 has passed over the wrapping device $A_2$ for the second layer rightward as viewed in FIGS. 1(a) and 1(b), the tube fabrication work of the web 30b is temporarily stopped, the tip of the web 40b for the second layer is fixed to the outer surface of the first layer spiral tube by welding or other means with the welding lines of the first and second layers mutually offset, and then the web feed devices $C_1$ and $C_2$ as well as the wrapping devices $A_1$ and $A_2$ are driven with the same pace to concurrently fabricate the first and second layer spiral tubes. Subsequently, when the tip of the web 40b has passed over the wrapping device $A_3$ for the third layer rightward as viewed in FIGS. 1(a) and 1(b), the tube fabrication work is again temporarily stopped, the tip of the web 50b for the third layer is fixed to the outer surface of the second layer spiral tube by welding or other means with the welding lines of the first, second and third layers mutually offset, and then the web feed devices $C_1$, $C_2$ and $C_3$ as well as the wrapping device $A_1$, $A_2$ and $A_3$ are driven with the same pace to concurrently fabricate the first, second and third layer spiral tubes.

In this way, the webs 30b, 40b and 50b are continuously wrapped in a spiral form and welded, and when any of the coils 30a, 40a and 50a has been entirely used, fabrication of the tube is once stopped, another coil 30a, 40a or 50a is newly charged in the pay-off reel 19, the lead end of the new web 30b, 40b or 50b is jointed to the trailing end of the last web 30b, 40b or 50b by means of the welding machine 21, and again the tube fabrication work is commenced. Then, the formed spiral tube is cut into desired lengths, and after edge preparation for circumferential welding has been done, a multi-layer spiral tube is completed.

In the above-described tube fabrication work, it is possible, if necessary, to support the outermost layer of the multi-layer spiral tube fabricated by the wrapping device $A_3$ by the rail 37 beneath the spiral tube and the truck for supporting the receiving rollers moving on the rail 37.

If the apparatus for fabricating multi-layer spiral tubes according to the present invention is used, owing to the fact that a web is wrapped around a wrapping drum whose outer circumferential surface is machined into a precise circular cylinder, a degree of roundness of the fabricated spiral tube is improved, and also owing to the fact that a plurality of web feed devices and wrapping devices are installed adjacent the direction of delivery of the fabricated tubes and the outer layer tubes are sequentially fabricated on the circumference of the lower layer tubes, it is possible to obtain a long-dimension multi-layer spiral tube. In particular, by installing the apparatus according to the present invention at the field of construction, the circumferential joints formed by all-attitude welding having low reliability can be reduced to a minimum, and hence a reduction in expenses can be achieved. In addition, owing to the fact that a web coil of high precision making little zig-zag movement is used and the gap between the side edges of the web can be adjusted by manipulating the laser gap sensor, the feed table and the heater, the side trimmer which was used in the apparatus in the prior art becomes unnecessary. Still further, owing to the face that, for the lowermost layer spiral tube, the portions of the web to be welded are welded by a large current while backing the portions with the backing section to give sufficient weld penetration, an I-shaped weld beveling suffices and an edge preparating machine becomes unnecessary. In addition, a multi-layer spiral tube can be fabricated at a single stroke with high efficiency, and fabrication of a long-dimension multi-layer spiral tube as compared to a multi-layer tube of the inner cylinder type in the prior art, is possible.

Since many changes and modifications can be done to the above-described construction without departing from the spirit of the present invention, it is intended that all matter contained in the above description and illustrated in the accompanying drawings shall be interpreted to be illustrative and not as a limitation to the scope of the invention.

What is claimed is:

1. An apparatus for fabricating a multi-layer spiral tube, said apparatus comprising:

a rotatable wrapping drum around which a first web forming the innermost layer of the multi-layer spiral tube is spirally wrapped during the fabrication of the multi-layer spiral tube;

a chuck located at one end of said wrapping drum for rotatably supporting said one end of said wrapping drum;

a first drive means operatively connected to said chuck and wrapping drum for rotating said wrapping drum supported by said chuck about an axis of rotation;

a rotatable take-up drum to which the lead edge of the first web is attached, said take-up drum having the same outer diameter as said wrapping drum and having an axis of rotation extending coaxial to said axis of rotation of said wrapping drum;

a second drive means operatively connected to said take-up drum for rotating said take-up drum about said axis of rotation thereof after said innermost layer is attached thereto at the same rate as said first drive means rotates said wrapping drum;

means operatively connected to said rotatable take-up drum for translating said take-up drum in a direction extending along said axis of rotation thereof towards said wrapping drum and away from said wrapping drum after said lead edge of the first web is attached to said take-up drum for advancing the first web spirally wrapped around said wrapping drum for forming the innermost layer of the multi-layer spiral tube;

a first web feed device adjacent said wrapping drum for feeding the first web forming the innermost layer of the multi-layer spiral tube to said wrapping and take-up drums;

a first wrapping device adjacent the outer periphery of said wrapping drum, said first web feed device feeding said first web between said first wrapping device and said outer periphery of said wrapping drum, said first wrapping device comprising first depressing means for pressing the first web against the outer periphery of said take-up drum, and first attaching means for joining adjacent side edges of the first web spirally wrapped around said wrapping drum;

a second web feed device for feeding a second web corresponding to an outer layer of the multi-layer spiral tube, said second web device spaced from said first web feed device in a direction away from said wrapping drum for feeding the second web on top of and around the first web, after the lead edge of said second web is attached to the innermost layer, in an orientation and direction in which the side edges of the second web do not overlie said adjacent side edges of the first web joined by said first welding means; and a second wrapping device associated with said second web feed device, the second web feed device feeding said second web between said second wrapping device and the first web formed as the inner most layer on top of which the second web is fed, said second wrapping device comprising second depressing means for pressing the second web against the innermost layer of the multi-layer spiral tube, and second attaching means for joining adjacent side edges of the second web after it is wrapped around the innermost layer.

* * * * *